(12) United States Patent
Ishii et al.

(10) Patent No.: US 6,504,833 B1
(45) Date of Patent: Jan. 7, 2003

(54) CHANNEL MULTIPLEXING METHOD IN MOBILE COMMUNICATION SYSTEM

(75) Inventors: Nobuaki Ishii, Tokyo (JP); Masaaki Okada, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/457,692

(22) Filed: Dec. 9, 1999

(30) Foreign Application Priority Data

Dec. 9, 1998 (JP) .......................................... 11-350162

(51) Int. Cl.[7] ................................................. H04J 3/16
(52) U.S. Cl. ....................................... 370/342; 370/329
(58) Field of Search ................................ 370/312, 319, 370/320, 321, 326, 329, 330, 335, 336, 341, 342

(56) References Cited

U.S. PATENT DOCUMENTS 4,799,252 A * 1/1989 Eizenhoffer et al. ......... 370/330
5,511,068 A * 4/1996 Sato ............................. 370/335
5,590,133 A * 12/1996 Billstrom et al. ........... 370/332
5,894,473 A * 4/1999 Dent ............................ 370/320
6,285,684 B1 * 9/2001 Suzuki et al. ............... 370/471

OTHER PUBLICATIONS

M.J. McTiffin et al., "Mobile Access to an ATM Network Using a CDMA Air Interface", IEEE Journal on Selected Areas in Communications, vol. 12, No. 5, Jun. 1994, pp. 900–908 with Abstract.

* cited by examiner

Primary Examiner—Thanh Cong Le
Assistant Examiner—Tsuleun R. Lei
(74) Attorney, Agent, or Firm—Sughrue Mion, PLLC (57) ABSTRACT

The system assigns, to the specific MT, the channel defined as the combination of one of the group codes and one of the address identifiers. The group code is selected to correspond to the channel group to which the specific MT belongs. The address identifier is determined to be unique in the channel group of the specific MT. Thus, the combination of the group code and the address identifier is unique in the service area provided by the BS, to serve the channel of the specific of the specific MT.

25 Claims, 11 Drawing Sheets

| GROUP CODE | ADDRESS IDENTIFIER | | | | |
|---|---|---|---|---|---|
| | AD#0 | AD#1 | AD#2 | ... | AD#m |
| #0 | #0 AD#0 | #0 AD#1 | #0 AD#2 | ... | #0 AD#m |
| #1 | #1 AD#0 | #1 AD#1 | #1 AD#2 | ... | #1 AD#m |
| #2 | #2 AD#0 | #2 AD#1 | #2 AD#2 | ... | #2 AD#m |
| #3 | #3 AD#0 | #3 AD#1 | #3 AD#2 | ... | #3 AD#m |
| #4 | #4 AD#0 | #4 AD#1 | #4 AD#2 | ... | #4 AD#m |
| #5 | #5 AD#0 | #5 AD#1 | #5 AD#2 | ... | #5 AD#m |
| ... | ... | ... | ... | ... | ... |
| #n | #n AD#n | #n AD#1 | #n AD#2 | ... | #n AD#m |

CHANNEL MULTIPLEXING METHOD IN MOBILE COMMUNICATION SYSTEM

BACKGROUND OF THE INVENTION

This invention relates to a mobile communication system and in particular, to the method of multiplexing channels in the mobile communication system.

It is well known in the art that CDMA technology gives us its greater bandwidth efficiency and multiple access capabilities than FDMA or the TDMA technologies. Generally, in CDMA communication system, signal spectrums to be transmitted are spread with codes assigned to respective users, and then, are multiplexed. When receiving the transmitted signal as a reception signal, each of the users despreads the reception signal with the code assigned to each user to extract data signal relating to each user. Thus, the codes for spreading signal spectrums serve to identify each user in the CDMA communication system and to define channels. If the codes are composed of eight and sixteen bits, it is possible to define code pattern of 256 and 65536, respectively. The number of code patterns allows the system to have high multiple access capabilities. Besides, the high Capabilities are accomplished on one frequency carrier wave, so that the system can gain high efficiency of bandwidth.

Recently, mobile communication systems tend to be used by a great number of users. Development of CDMA technology accelerates the increase of the number of users more and more. In order to respond to the increase of the users, a lot of code patterns have been required. On the other hand, the code patterns are finite in number and, in addition, all of the code patterns can not be always assigned to users. Under the circumstances, the code patterns might be exhausted with the increased users in the future, and emergence of high efficient system is expected in the art.

SUMMARY OF THE INVENTION

This invention therefore improves the CDMA communication system to provide new communication system having much greater multiple access capabilities.

According to one aspect of the present invention,. a mobile communication system employs the following method to assign a channel to a specific one of mobile terminals existing on a service area provided by a base station which has a plurality of codes. Herein, the mobile terminal is referred to as the MT, and also, the base station is referred to as the BS.

In one aspect of the present invention, the plurality of the codes are classified into a plurality of channel groups (also referred to as "terminal groups"), so that a plurality of group codes of the channel groups are allocated to the plurality of the codes, respectively. One of the channel groups to which the specific MT belongs is determined, and a unique address identifier in the channel group is labeled for the specific MT. The group code allows to distinguish between the channel groups, while the address identifier allows to distinguish one of the MTs from the other MTs in each channel group. That is, a combination of the address identifier and the group code is unique in the service area which the BS provides. Therefore, the specific MT is defined, as the channel, the combination of the address identifier labeled for the specific MT and the group code corresponding to the channel group to which the specific MT belongs.

The channel assigning method may be executed for the MT moving into the service area of the BS and may be uniformly executed for all of the MTs existing on the service area of the BS. In this case, the BS may notify the MTs of the respective combinations of the address identifiers and the group codes.

DETAILED DESCRIPTION OF THE PREFERRED EMBODIMENTS

Figure 1:
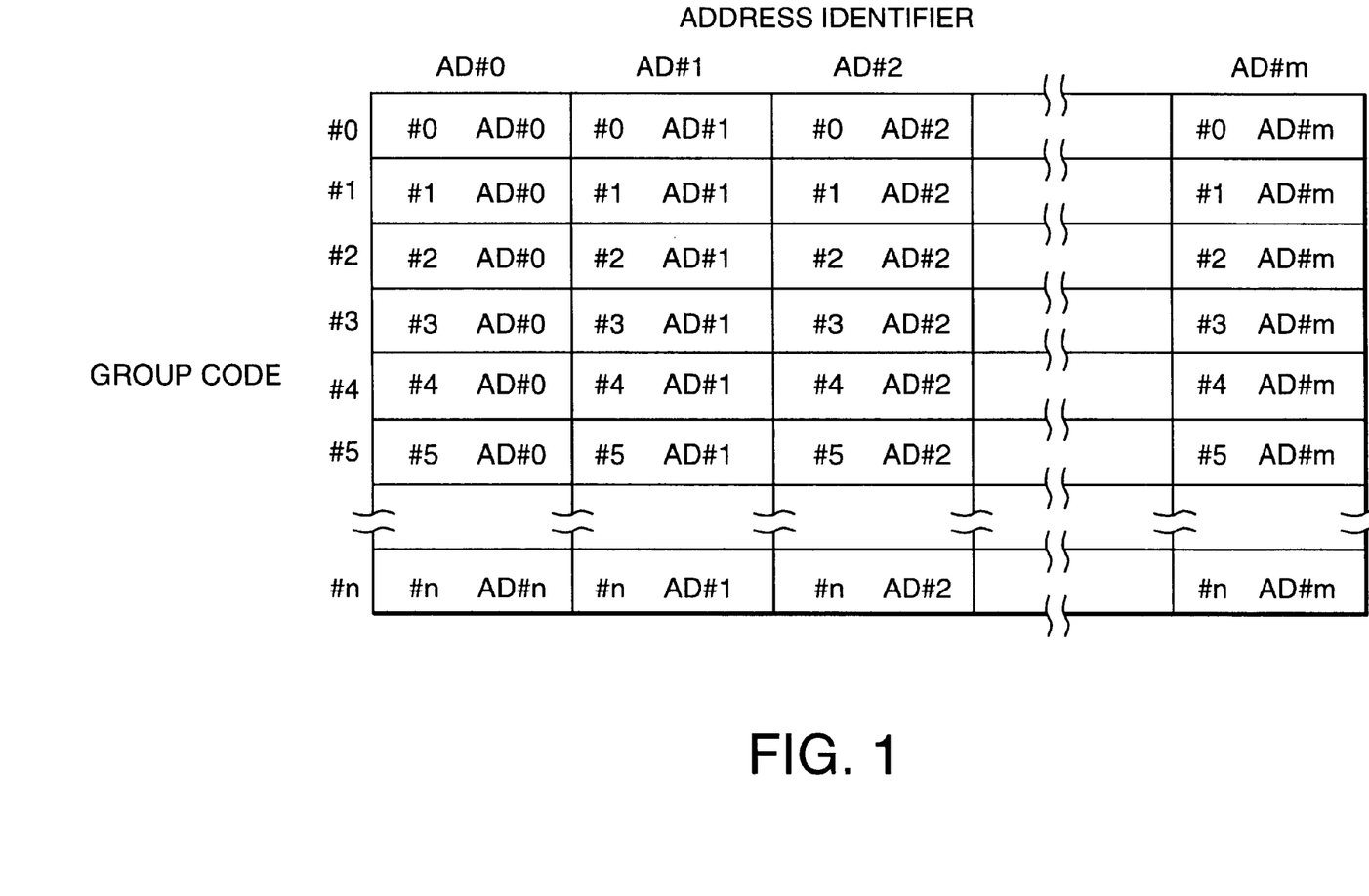
FIG. 1 is for use describing in a concept of one aspect of the present invention, especially, channels as combinations of address identifiers and group codes.
Figure 2:
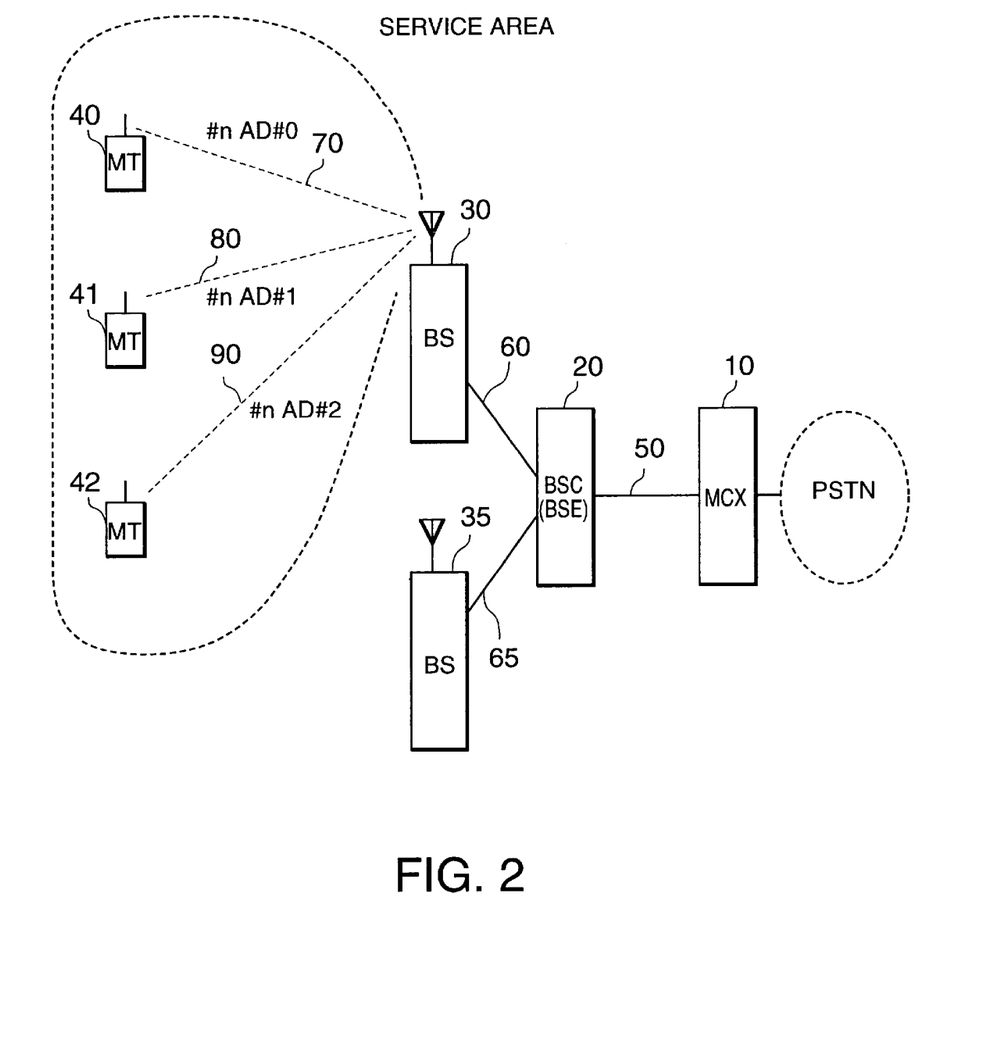
FIG. 2 depicts an exemplary mobile communication network, including MTs, BSs, BSC (base station controller)

Channels, according to an embodiment of the present invention, may conceptually be depicted in FIG. 1. An exemplary mobile communication network may be viewed as shown in FIG. 2. In the network, a MCX (mobile Communication eXchange) 10 is connected to PSTN (Public Switched Telephone Network), and also, is connected to a BSC (base station controller) 20 with a communication line 50. The BSC 20 is also referred to as a BSE (base station equipment). The BSC 20 is connected to BSs 30, 35 with communication lines 60, 65, respectively. The communication lines 50, 60, 65 are so-called "wired communication lines." The BS 30 provides a service area where MTs 40, 41, 42 exist. Wireless channel 70, 80, 90 are assigned to MTs 40, 41, 42, respectively.

As already mentioned, each channel 70, 80, 90 may be defined as a combination of a group code and an address identifier. In a conventional CDMA technology, only one MT uses one group code (merely called "code" because of no concept about channel group. According to the preferred embodiment, since one group code can be shared by a plurality of the MTs, the number of the accommodatable users (or MTs) at one BS increases drastically. Now, detail explanation will be made about such channel assigning method with reference to drawings. For explanation of the channel assigning method, it is assumed that a BS 30 has #0~#n codes and a channel assigning target is a specific one of MTs 40 existing on a service area which the BS 30 provides.

The code #0~#n are classified into channel groups (or terminal groups) #0~#n, and accordingly, group codes

0~#n of the channel groups are allocated to the code #0~#n which the BS 30 has. One of the channel groups, for example, the channel group #n is selected as the group to which the specific MT 40 belongs, and a unique address identifier in the channel group #n is labeled for the specific MT. In this explanation, the specific MT 40 is labeled the address identifier AD#0 for the MT 40 itself.

Herein, each of the group codes #0~#n allows to distinguish between the channel groups #0~#n, for example, to distinguish between the channel groups #n and the other groups #0~#n-1. Each of the address identifiers AD#0~AD#n allows to distinguish one of the MTs from the other MTs in each channel group, for example, to distinguish the MT 40 from the MTs 41, 42. Thus, a combination of the address identifier AD#0~AD#n and the group code #0~#n is unique in the service area which the BS 30 provides.

The specific MT 40 is therefore defined, as the channel 70, the combination #and#0 of the address identifier AD#O and the group code #n, and can be distinguished from the other MTs 41, 42, or the like, existing on the service area which the BS 30 provides. The channel assigning method may be executed for the MT moving into the service area of the BS and may be uniformly executed for all of the MTs existing on the service area of the BS. In this case, the BS may notify the MTs of the respective combinations of the address identifiers and the group codes.

Figure 3:
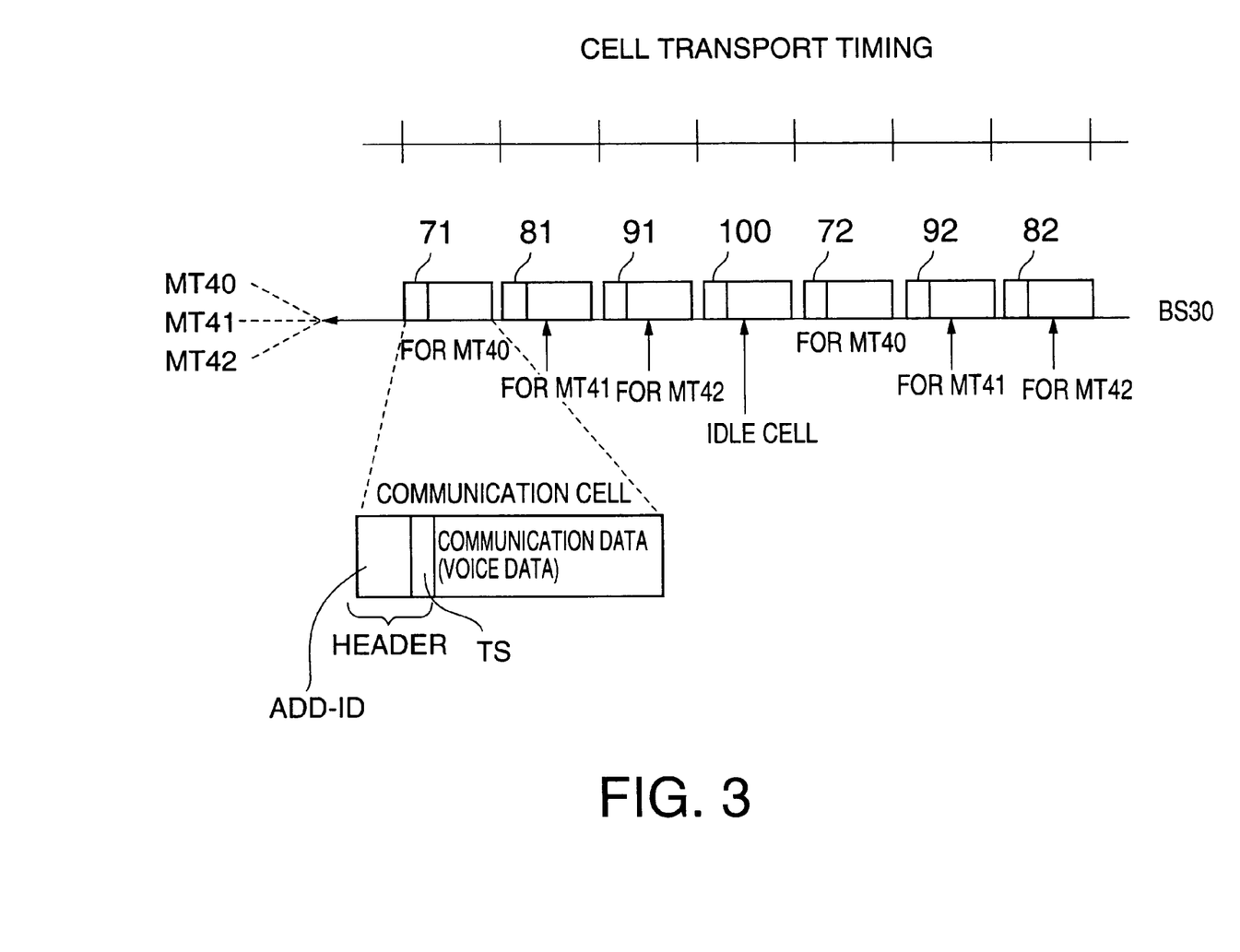
FIG. 3 depicts downstream transmission from the BS to the MTs.

In accordance with the channel assigning method, downstream transmission, especially, a method of multiplexing channels on the downstream transmission may conceptually be shown in FIG. 3. In this channel multiplexing method, downstream transmission data of the channels assigned to the MTs are packaged into communication cells with headers, at each of the channel groups. FIG. 3 shows a case of channel group #n. Herein, the headers may comprise address identifier fields (ADD-IDs) and TS (Time-Stamp) fields, respectively. The ADD-ID fields may store the address identifiers AD#0~AD#2, each corresponding to one of the channels 70~90 in the channel group #n. The TS fields are used for soft-handoff, for voice conversion timing in vocoders (described in later), for checking period of voice signal, and so on.

Furthermore, at every channel group, the communication cells multiplexed into a group signal corresponding to one of the channel groups. Spectrums of the group signals are spread with group codes assigned to the channel groups, respectively, and thereby, spread group signals are produced. And then, the spread group signals are multiplexed into a multiplexed signal to be used for the downstream transmission.

The downstream transmission processes all may be executed by the BS 30. Alternatively, the channel grouping, the data packaging and the cell multiplexing processes may be executed by the BSC 20, while the spectrum spreading and the signal multiplexing processes may be executed by the BS 30. Besides, the communication cells may be one of variable-length packets, fixed-length packets, and ATM cells. Specifically, variable-length packets may be of maximum length defined.

When receiving such multiplexed signal as a reception signal, the MIT 40 may demultiplex the reception signal into downstream transmission data sent from the BS 30, as mentioned below. First, the MT 40 despreads the reception signal with the group code #n, to selectively demodulate the group signal of the channel group to which the MT 40 belongs. The MT 40 checks the address identifiers out. As mentioned above, the address identifiers are included in the headers of the communication cells which comprise the group signal. And thereby, the MT 40 can identify each of the communication cells assigned to the MT itself. At last, the MT 40 processes the identified communication cells 71, 72 and so forth, into the downstream transmission data of the channel 70 of itself.

Figure 4:
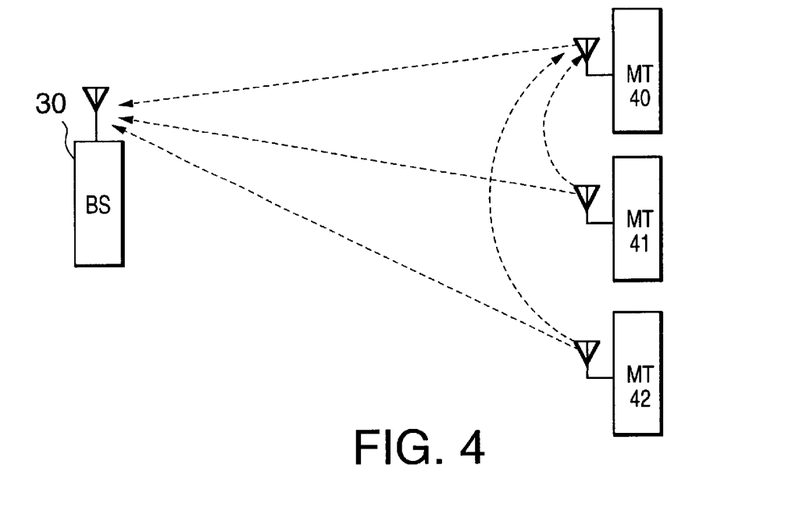
FIG. 4 depicts access contention detection of upstream transmission.
Figure 5:
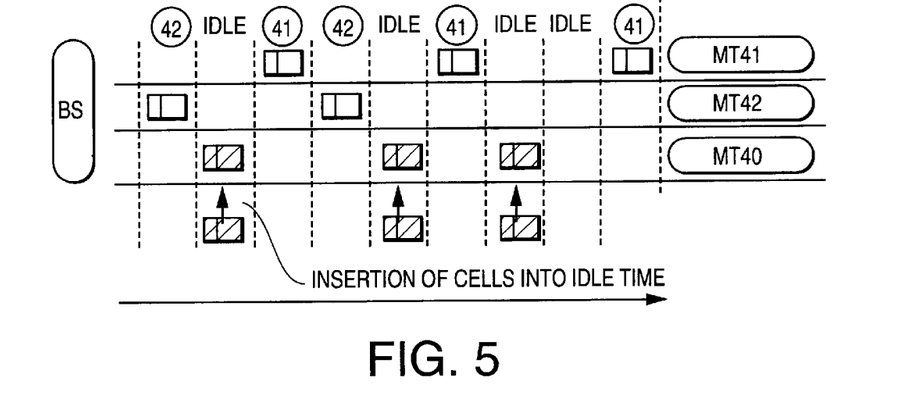
FIG. 5 depicts access contention resolution of upstream transmission.
Figure 6:
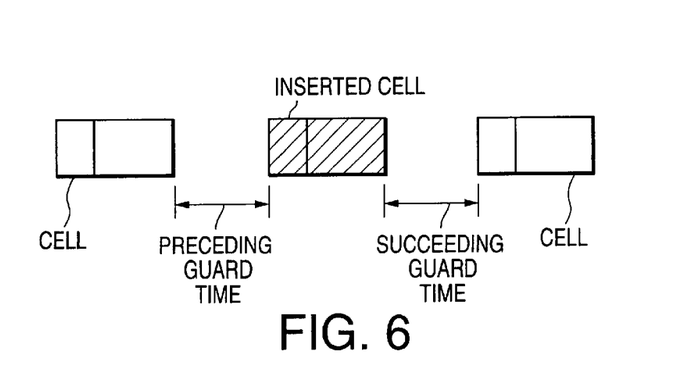
FIG. 6 depicts the relationship between inserted cell and other cells on the upstream transmission.

On the other hand, upstream transmission, especially, a method of multiplexing channels on the upstream transmission may be shown in FIGS. 4~6. In the upstream transmission, incooperation of the MTs 40, 41, 42 causes interference between upstream transmission of the MT 40 and the other MTs 41, 42, because the MT 40 and the other MTs 41, 42 even use the same frequency and the same group code for upstream transmission. Therefore, the upstream transmission is different from the above mentioned downstream transmission, and requires to adjust the relationship between the MT 40 and the other MTs 41, 42 which belong to the same channel group as the MT 40.

The MT 40 packages upstream transmission data of the channel corresponding to the MT 40, into communication cells with headers. Herein, each of the headers uniformly contains the address identifier of the MT 40 (AD#0). While packaging, the MT 40 detects access contention between the MT 40 itself and the other MTs 41, 42 of the same channel group. In detail, the access contention detecting processes monitors the upstream transmission of the other MTs 41, 42, as shown in FIG. 4. As the result of access contention detecting, idle times with no contention are obtained. Herein, the access contention detecting processes may use GPS timing signals to obtain synchronized timing of the upstream transmission from the other MTs, so that the calculation of the idle times carries out quickly.

When obtaining the idle times, the MT 40 resolves the access contention, by assigning the communication cells of itself to the idle times. Such assigning is depicted in FIG. 5. Some access contention resolving processes may require a transmission order between the MTs which belong to the same terminal group, such as the MTs 40, 41, 42. The transmission order may be predetermined or may be obtained by negotiations between the MTs. For example, the transmission order assumes that the MT 40 may transmit cells after cells the MT 42 or may transmit cells at a time when cells of the MT 42 do not exist, and beside, the cell of the MT 42 is arranged after the cell of the MT 41. In this assumption, the MT 40 may insert the communication cell of itself into the idle time succeeding to the cell of the MIT 42. Instead, the MT 40 may insert the communication cell of itself into the idle time when the MT 40 can not detect the cell of the MT 42 following to the cell of MT 41. The TDM (Time-division multiplexing) technology allows the upstream transmission to be more simple to resolve the access contention.

Under the circumstances, the MT 40 spreads spectrums of the communication cells by the use of the group code assigned to the channel group of itself, to transmit them through the assigned idle times, respectively. Also shown in FIG. 6, the access contention resolving process may assign the communication cells to the idle times with preceding and succeeding guard times left before and after each communication cell, respectively.

In the channel multiplexing on the upstream transmission, the communication cells may be one of variable-length packets, fixed-length packets, and ATM cells, again. Specifically, variable-length packets may be of maximum length defined, too.

Next, a concrete description made about the case where the communication cells are the ATM cells.

Figure 7:
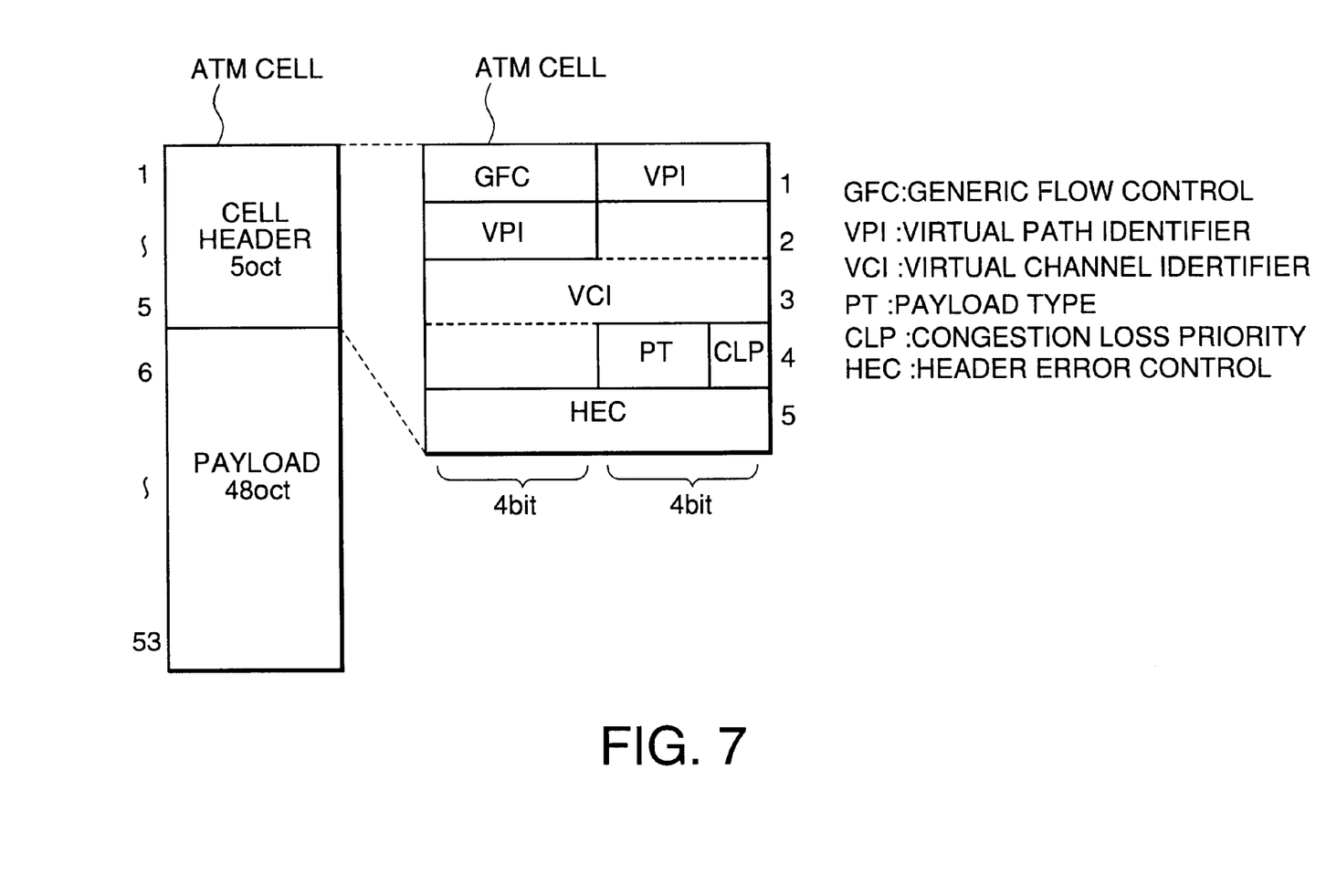
FIG. 7 shows ATM cell format and header format.

Referring to FIG. 7, each ATM cell is fifty-three bytes and consists of five octets of header information and forty-eight octets of payload data. Furthermore, one of the header formats defined by the ATM standards groups, the UNI header format is also depicted in FIG. 7. The UNI header consists of the following fields: GFC (generic flow control), VPI (virtual path identifier), VCI (virtual channel identifier), PT (payload type), CLP congestion loss priority), and HEC (header error control).

The GFC field comprises four bits and can be used to provide local function, such as identifying multiple stations that share a single ATM inerface.

Typically, the GFC field is not used and is set to a default value. The VPI field comprises eight bits and is used, in conjunction with the VCI, to identify the next destination of a cell when it passes through a series of ATM switches on its way to its destination.

The VCI field comprises sixteen bits and is used, in conjunction with the VPI, to identify the next destination of a cell when it passes through a series of ATM switches on its way to its destination. Specifically, the VCI field serves as the above-mentioned address identifier.

The PT field comprises three bits. Among them, the first bit indicates whether the cell contains user data or control data. If the cell contains user data, the second bit indicates congestion. and the third bit indicates whether the cell is the last in a series of cells that represent a single AAL frame. The CLP field comprises one bit, and indicates whether the cell should be discarded if it encounters extreme congestion as it moves though the network. The HEC field comprises eight bits, and is checksum calculated only on the header itself.

In case where such ATM cells are used as the communication cells, the mobile communication network according to the preferred embodiment can be considered to be ATM network, except for transmission path between leaf nodes and ATM switch closest to the leaf nodes, because the transmission path is physically common to some leaf nodes. Herein, the leaf nodes are MTs and the closest ATM switch is the BS, according to the above expression. In other words, the BSC may be similar to the ATM switch having a function of the conventional BSC.

Figure 8:
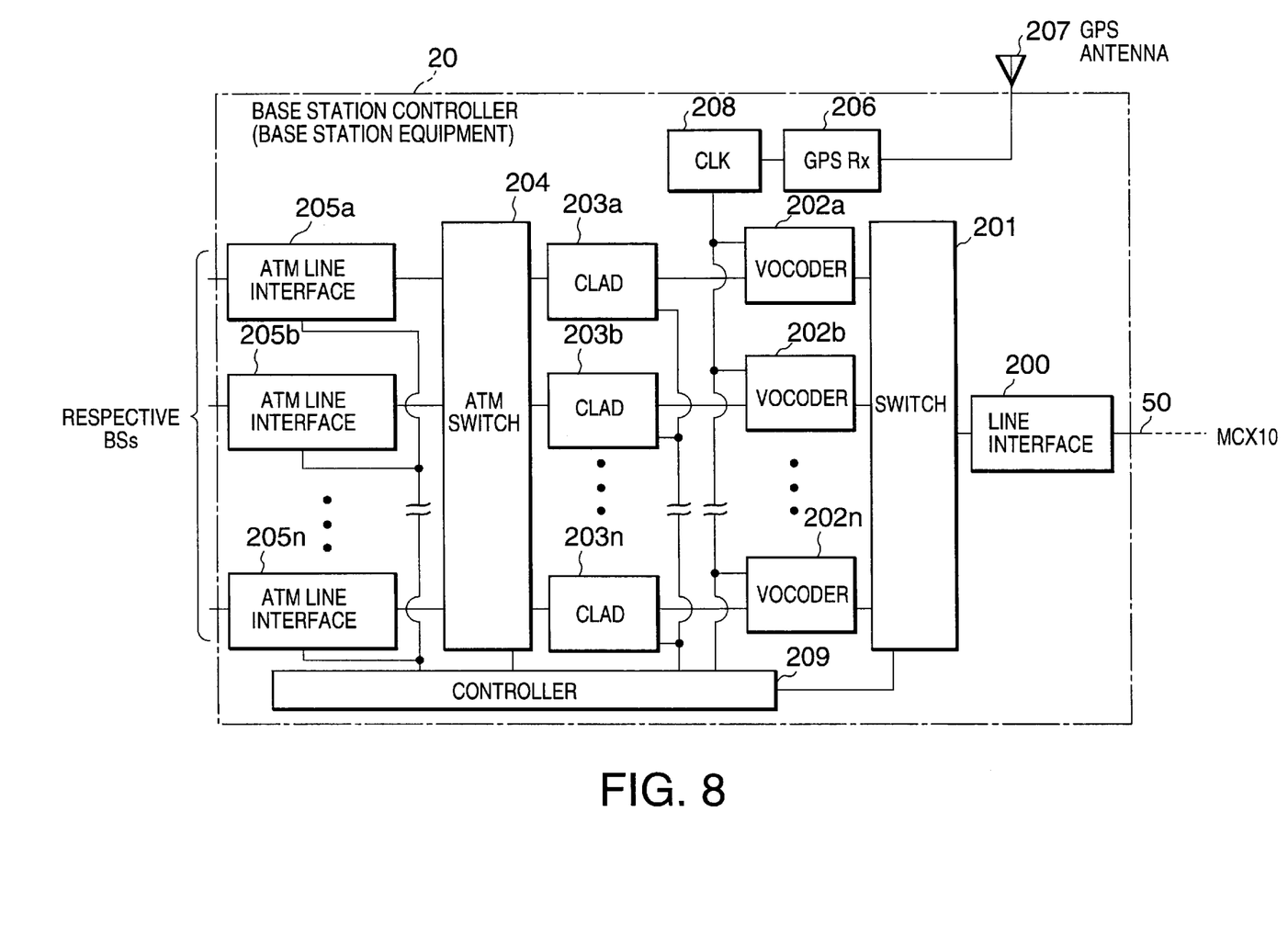
FIG. 8 shows, in schematic form, an exemplary base station controller.

Referring to FIG. 8, the BSC 20 comprises a line interface 200, a switch 201, vocoders 202a~202n, CLAD devices 203a~203n, an ATM switch 204, ATM line interfaces 205a~205n, a GPS receiver 206, a GPS antenna 207, a clock unit 208, and a controller 209. The vocoders 202a~202n, the CLAD devices 203a~203n, and the ATM line interfaces 205a~205n correspond to the BSs.

The line interface 200 is connected to the MCX 10 via the communication line 50. The switch 201 switches to multiplex voice signals transmitted into the line interface 200, and alternatively, to demultiplex signals transmitted from the line interface 200 to produce the voice signal. Each of the vocoders 202a~202n carries out encoding/decoding of the voice signals. When receiving the voice signal from the respective vocoders 202a~202n, the CLAD devices 203a~203n disassemble the voice signals into the ATM cells with headers of the respective BSs. Alternatively, when receiving the ATM cells from the respective BSs, the CLAD devices 203a~203n assemble the ATM cells into the voice signal to be transmitted to the respective vocoders 202a~202n.

The ATM switch 204 carries out the cell switching between the CLAD devices 203a~203n and the ATM line interfaces 205a~205n. The clock unit 208 receives GPS timing signals through the GPS antenna 207 and the GPS receivers 206, to output the GPS timing signals into the vocoders 202a~202n and the controller 209. The controller 209 controls the entire BSC 20.

Figure 9:
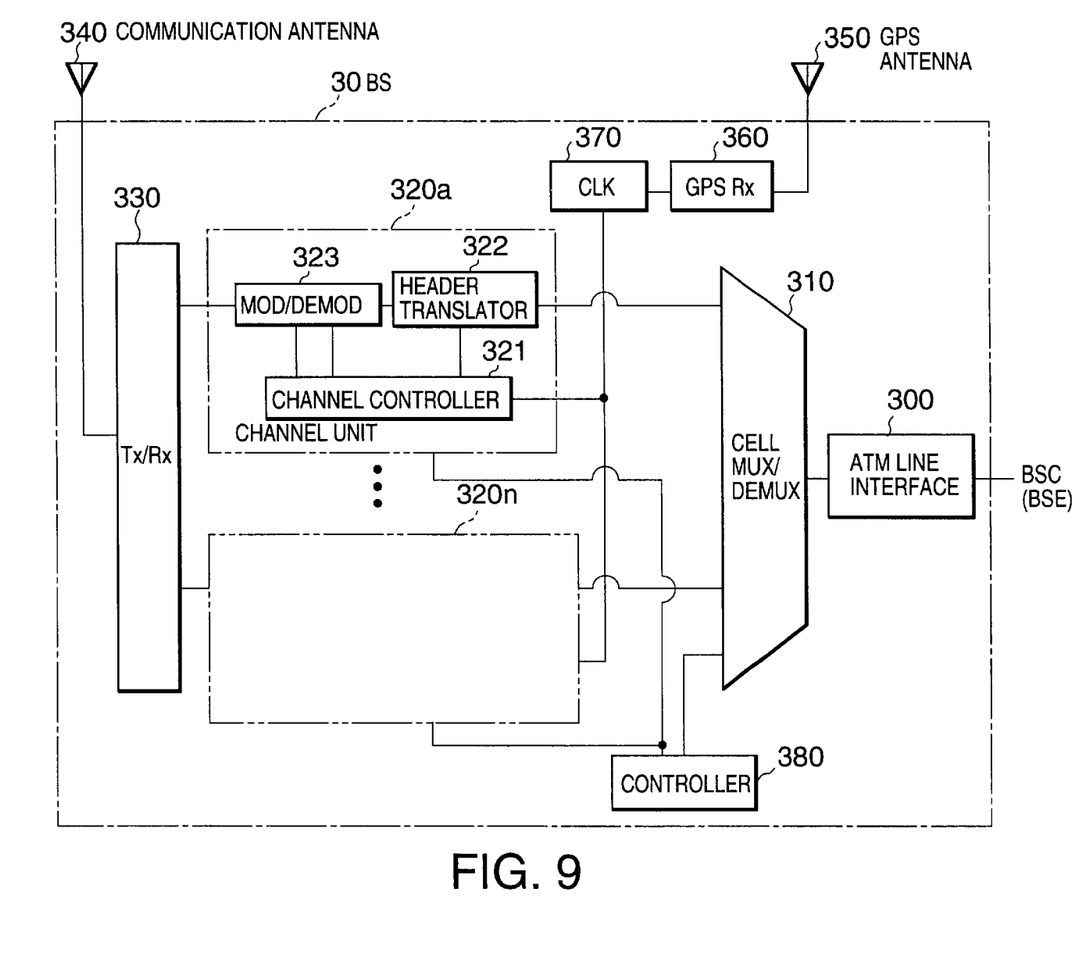
FIG. 9 shows, in schematic form, an exemplary base station.

Referring to FIG. 9, the BS 30 comprises an ATM line interface 300, a cell multiplexer/demultiplexer 310, channel units 320a~320n, a transmitter/receiver 330, a communication antenna 340, a GPS antenna 350, a GSPS receiver 360, a clock unit 370, and a controller 380.

The ATM line interface 300 is connected to the BSC 20 via the communication line 60, and transmits/receives the ATM cells into/from the ATM line interface of the BSC 20. The cell multiplexer/demultiplexer 310 demultiplexes downstream ATM cells transferred from the BSC 20, in correspondence with the terminal groups. Alternatively, the cell multiplexer/demultiplexer 310 receives upstream ATM cells from the channel unit 320a~32n to multiplex them. The multiplexed upstream ATM cells are transferred for the BSC 20.

The GPS receiver 360 is coupled to the GPS antenna 350, and receives the GPS reference clock signals to output them into the clock unit 370. When receiving them, the clock unit 370 produces GPS timing signals to output them into every channel units 320a~320n.

Each of the channel units 320a~320n comprises a channel controller 321, a header translator 322, and a modulator/demodulator 323. The channel controller 321 controls the a header translator 322, and a modulator/demodulator 323, based on the requirement of the controller 380 and on the GPS timing signals from the clock unit 370.

The header translator 322 translates headers of the downstream ATM cells sent from the BSC, into other headers including address identifiers assigned to the mobile terminals of the corresponding terminal group. At this time, the header translator 322 adds the TS indicative of transmission time to the header field. Alternatively, the header translator 322 translates the headers of the upstream ATM cells into other headers for the BSC.

The modulator/demodulator 323 executes carrier wave modulation/demodulation and spreading/despreading with the respective group code. On establishing connection, the modulator/demodulator 323 also notifies the corresponding MT of the carrier wave frequency and of the corresponding group code.

In detail, the modulator/demodulator 323 spreads spectrums of the downstream ATM cells with the group code, to produce spread data signals. On the other hand, the modulator/demodulator 323 despreads upstream reception signals received from the MT via the communication antenna and the transmitter/receiver 330, by the use of the group code, to produce the upstream ATM cells.

The transmitter/receiver 330 transmits the spread data signals into the MT. And alternatively, the transmitter/receiver 330 receives, from all MTs of the corresponding terminal group, the spread signals of the upstream ATM cells as the upstream reception signals.

Figure 10:
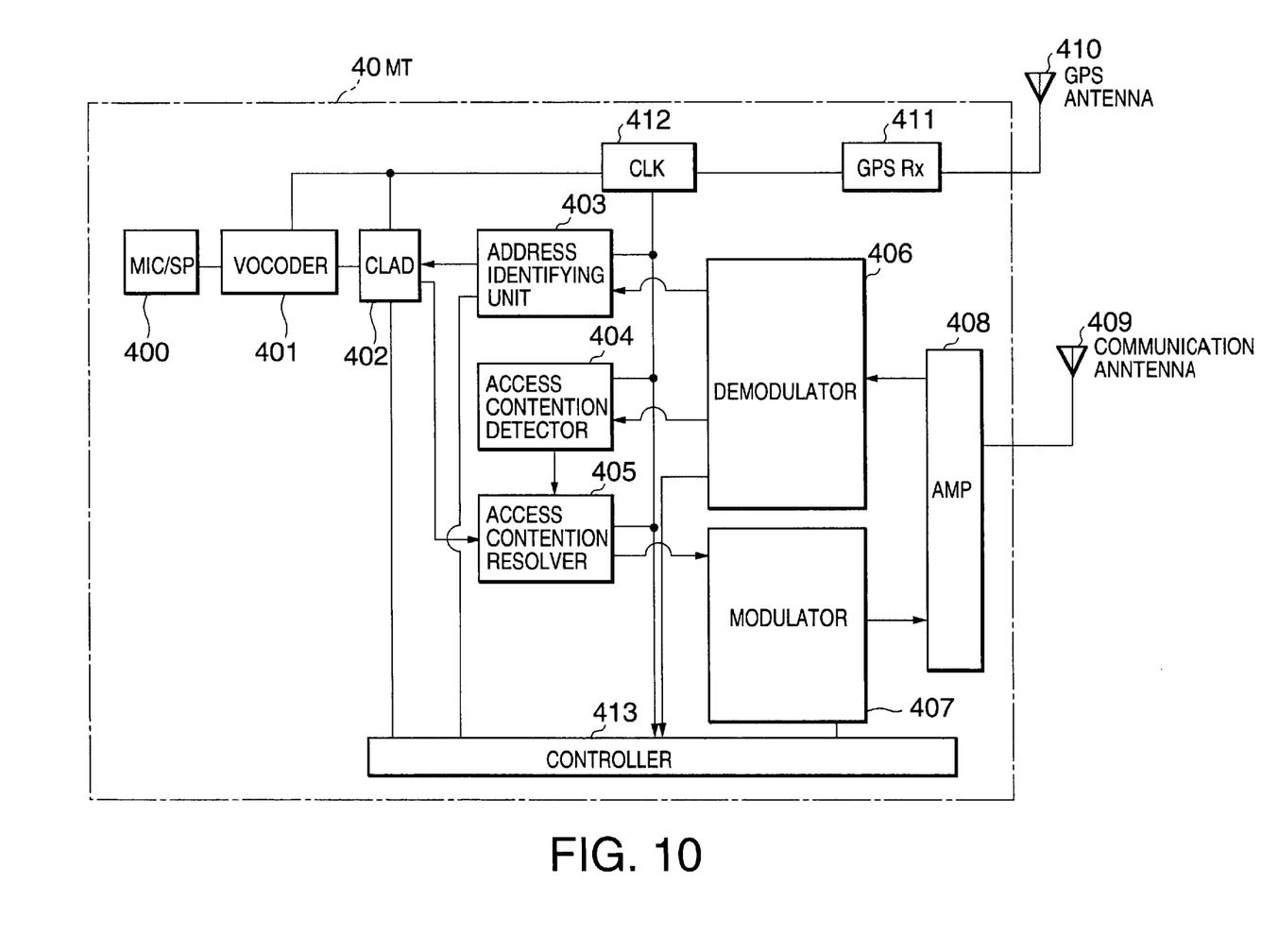
FIG. 10 shows, in schematic form, an exemplary mobile terminal.

Referring to FIG. 10, the MT 40 comprises a microphone/speaker unit 400, a vocoder 401, a CLAD device 402, an address identifying unit 403, an access contention detector 404, an access contention resolver 405, a demodulator 406, a modulator 407, an amplifier 408, a communication antenna 409, a GPS antenna 410, a GPS receiver 411, a clock unit 412, and a controller 413.

The communication antenna 409 receives the spread data signal as a reception signal. The amplifier 408 amplifies the reception signal to transmit it into the demodulator 406. The demodulator 406 despreads the reception signal with the group code #n, to extract the downstream ATM cells which belong to the corresponding terminal group of the MT 40 itself. The address identifying unit 403 identifies which downstream ATM cells belong to the MT 40, by checking out the address identifiers included in the headers of the extracted ATM cells. The CLAD device 402 assembles the identified ATM cells into downstream transmission data sent for the MT 40 from the BS 30. The vocoder 401 executes decoding the downstream transmission data into the voice signal to be output into the microphone/speaker unit 400.

On the other hand, the vocoder 401 executes encoding of the voice signal received from the microphone/speaker unit 400, to output the encoded voice signal as upstream transmission data of the MT 40. The CLAD device 402 disassembles the upstream transmission data into upstream ATM cells. The upstream ATM cells all input into the access contention resolver 405.

Herein, the demodulator 406 is of frequency synthesized type, and can demodulate at least two frequencies of upstream transmission and downstream transmission. Such demodulator 406 also demodulates the upstream transmission of the other MTs 41, 42, to supply extracted upstream ATM cells of the other MTs 41, 42 to the access contention detector 404.

The access contention detector 404 detects access contention between the MT 40 and the other MTs 41, 42 of the same terminal group, to calculate idle times with no contention. In detail, the access contention detector 404 receives the extracted upstream ATM cells of the other MTs 41, 42, and monitors the extracted upstream ATM cells. And thereby, the access contention detector 404 obtains the idle times on the upstream transmission from the other MTs 41, 42.

The access contention resolver 405 resolves the access contention by assigning the upstream ATM cells of the MT 40 to the idle times. As shown in FIG. 6, the access contention resolver 405 may assign the upstream ATM cells to the idle times with preceding and succeeding guard times left before and after each upstream ATM cell, respectively.

The modulator 407 spreads spectrums of the upstream ATM cells by the use of the group code #n assigned to the terminal group of the MT 40. And then, the modulator 407 transmits a spread signal of the upstream ATM cells through the amplifier 408 and the communication antenna 409 at the assigned idle times.

The GPS receiver 411 is coupled to the GPS antenna 410, and receives the GPS reference clock signals to output them into the clock unit 412. When receiving them, the clock unit 412 produces GPS timing signals to output them into the vocoder 401, the CLAD device 402, the address identifying unit 403, the access contention detector 404, the access contention resolver 405, and the controller 413. The controller 413 controls the entire MT 40. The access contention detector 404 may use the GPS timing signals to obtain synchronized timing of the upstream transmission from the other MTs 41, 42, and thereby the calculation of the idle times carries out quickly.

Operation in the above-mentioned mobile communication network will be explained with reference to the drawings.

Figure 11:
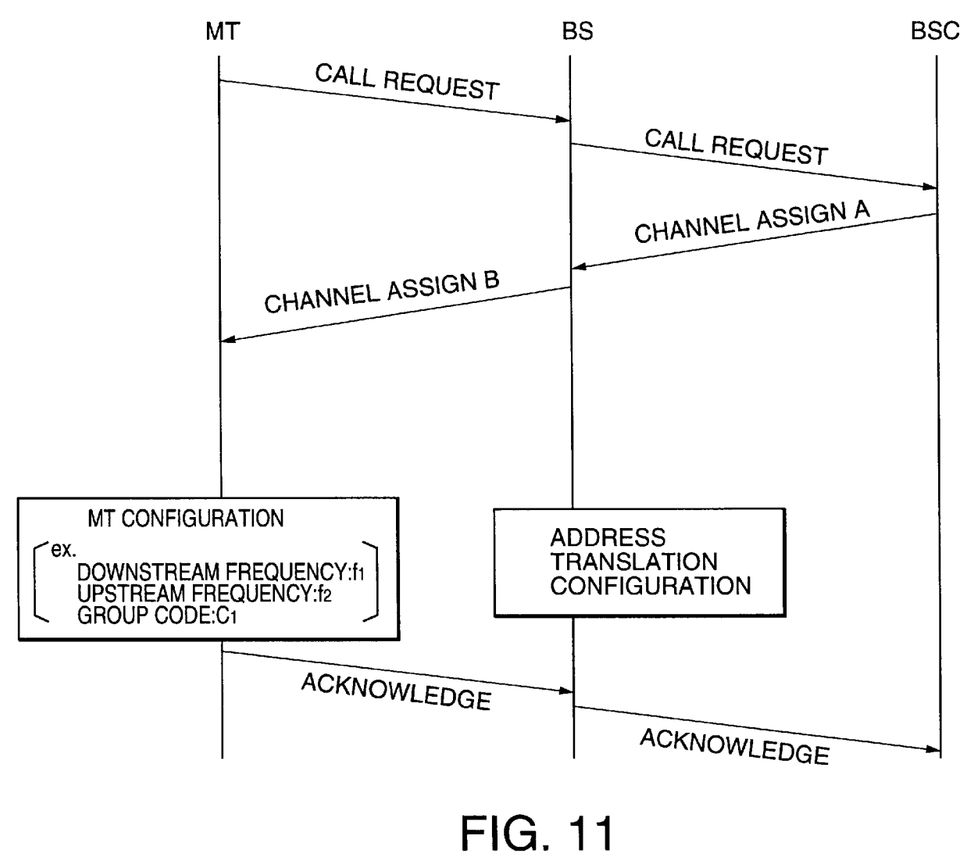
FIG. 11 shows channel assigning process in an exemplary mobile communication system.

When moving in the service area provided by the BS 30, the MT 40 transmits a call request signal via the BS 30 into the BSC 20, as shown in FIG. 11. On receiving such call request signal, the BSC 20 transmits a channel-assigning signal A for the MT 40. In this event, the channel-assigning signal A includes the header information (or the label) of the MT 40, but the header information is for public use and comprises a base station No., a channel group No., and a channel No. which corresponds to the address identifier mentioned above. Herein, the base station No. is used for the switching in the switch 201 and for another switching in the ATM switch 204, while the channel group No. is used for the multiplexing/demultiplexing in the cell multiplexer/demultiplexer 310. The channel-assigning signal A further has information about carrier wave frequencies and a group code both of which are used for MT 40. Herein, the carries wave frequencies are two of downstream and upstream frequencies. For example, the downstream frequency, the upstream frequency, and the group code are represented by $f_1$, $f_2$, $C_1$, respectively.

When receiving the channel-assigning signal A, the BS 30 executes an address translation configuration, namely, configuration of the address translation table. And according to the address translation table, the BS 30 translates the header information of the channel-assigning signal A, to transmit, into the MT 40, a channel-assigning signal B including another header information. The header information comprises the channel No., but does not comprise the base station No. and the channel group No. Furthermore, the channel-assigning signal B also has the information about carrier wave frequencies and a group code both of which are used for MT 40. Responsive to the channel-assigning signal B, the MT 40 configures the downstream frequency $f_1$, the upstream frequency $f_2$, and the group code $C_1$, to MT 40 itself.

Figure 12:
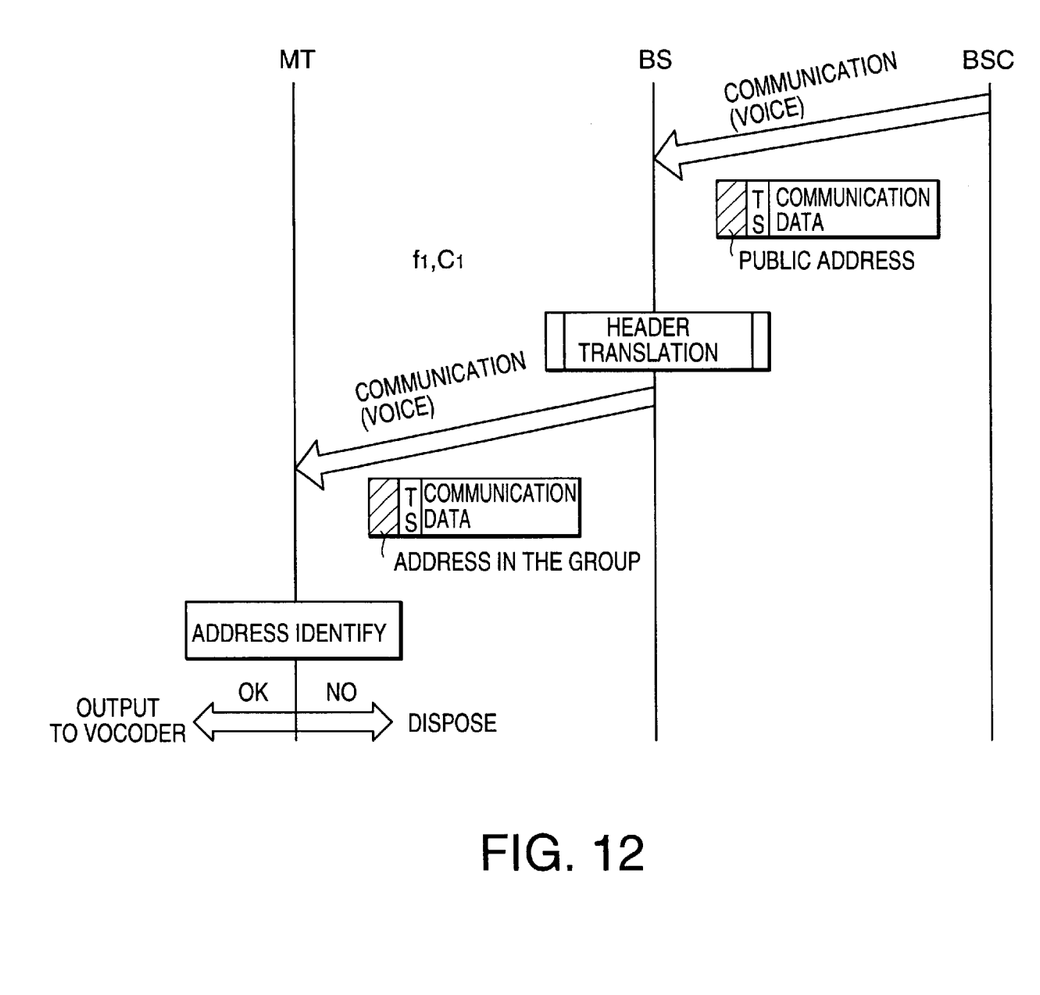
FIG. 12 shows downstream transmission in the mobile communication system.

The downstream transmission process may be viewed as shown in FIG. 12. The BSC 20 transmits communication (voice) cell for the MT 40. The communication cell comprises a TS and a public address consisting of the base station No., the channel group No., and the channel No. The BS 30 executes the header translation for the communication cell, to produce another communication cell which comprises the channel No. but does not the base station No. and the channel group No. Herein, the communication cell is spread with the group code $C_1$, and is carried on the carrier wave of frequency $f_1$. On receiving the communication cell, the MT 40 despreads it with the group code $C_1$, and then, identifies the address identifier as the channel No. As the result of identification, if the communication cell belongs to the MT 40, the MT 40 inputs the communication cell into the vocoder of itself. On the contrary, the MT 40 disposes the communication cell if the communication cell does not belong to the MT 40.

Figure 13:
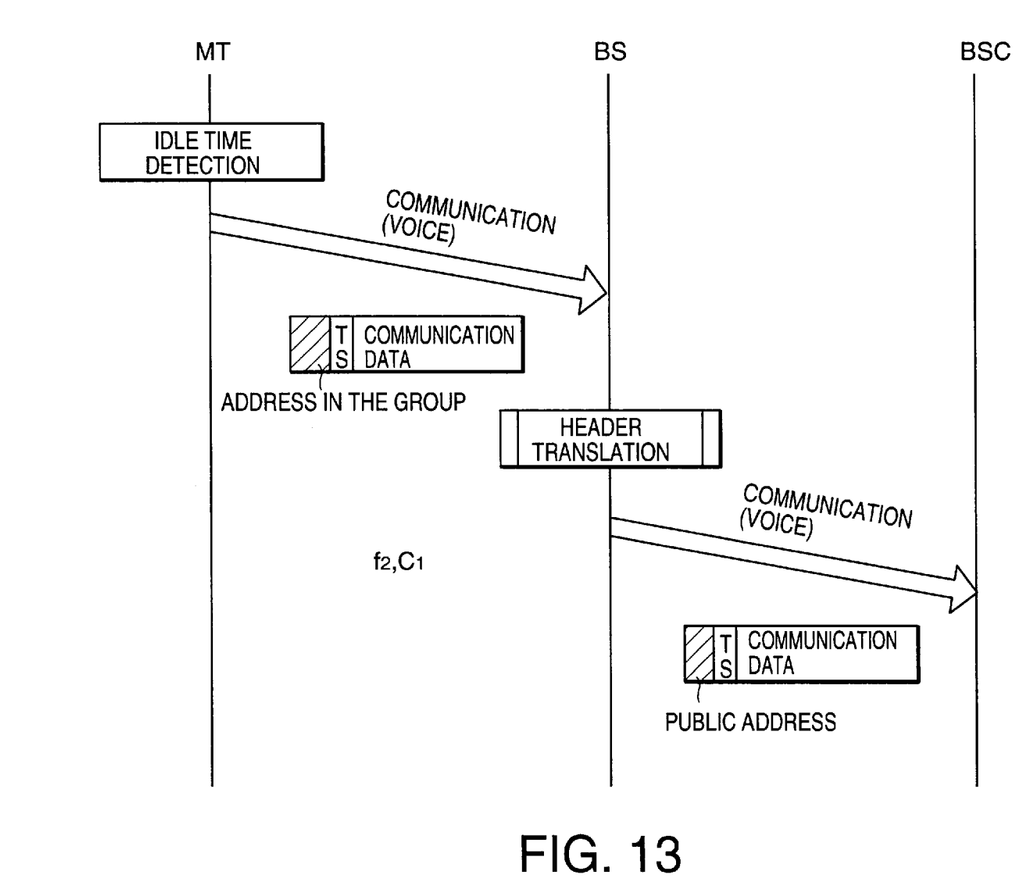
FIG. 13 shows upstream transmission in the mobile communication system.

The upstream transmission process may be viewed as shown in FIG. 13. To transmit the communication cell, the MT 40 executes the idle time detection. When detecting the idle time, the MT spreads the communication cell with the group code $C_1$ and carries the spread communication cell on the carrier wave of frequency $f_2$, to transmit it. In this event, the communication cell has the channel No. but does not the base station No. and the channel group No. Such communication cell is subjected to the header translation in the BS 30, to be transmitted, into the BSC 20, as another communication cell which comprises all of the channel No., the base station No., and the channel group No., as its header information.

While this invention has thus far been described in conjunction with few preferred embodiments thereof, it will now readily possible for those skilled in the art to put those embodiment into various other manners under the present invention. For example, the BSC 20, the BS 30, and the MT 40 all have the GPS receiver, but instead, other means to synchronize transmission timings therebetween. In the foregoing explanation, the system uses two kinds of headers. That is, one header is used on the communication line between the BSC and the BS, while the other header is used on the wireless channel between the BS and the MT. However, this invention allows the one header to be same as the other header. Furthermore, the present invention does not restrict which the apparatus of the BS and the BSC have the CLAD device, if the transmission between the BS and the MT is compliant to the channel assigning method, for example, described in above with FIG. 1.

What is claimed is:

1. A method of multiplexing channels on downstream transmission from a base station to mobile terminals in a mobile communication system, comprising the steps of:

grouping the channels into channel groups;

packaging, in each of the channel groups, transmission data of the channels assigned to the mobile terminals, to form communication cells with headers containing address identifiers each of which corresponds to one of the channels in the channel group;

multiplexing, in every channel group, the communication cells into a group signal corresponding to one of the channel groups;

spreading spectrums of the group signals with group codes which are assigned to the channel groups, respectively, and are different from each other, to produce spread group signals; and multiplexing the spread group signals into a multiplexed signal to be used for the downstream transmission.

2. A channel multiplexing method as claimed in claim 1, wherein all of the steps are executed by the base station.

3. A channel multiplexing method as claimed in claim 1, the mobile communication system further comprising a base station controller, wherein:

the channel grouping, the data packaging and the cell multiplexing steps are executed by the base station controller; and the spectrum spreading and the signal multiplexing steps are executed by the base station.

4. A channel multiplexing method as claimed in claim 1, wherein the communication cells are variable-length packets.

5. A channel multiplexing method as claimed in claim 1, wherein the communication cells are fixed-length packets.

6. A channel multiplexing method as claimed in claim 1, wherein the communication cells are ATM cells.

7. A method of receiving, as a reception signal, the multiplexed signal defined in claim 1, to demultiplex the reception signal into down stream transmission data sent from the base station, said method being executed in each of the mobile terminals and comprising the steps of:

despreading the reception signal by the use of the group code of the channel group including the channel corresponding to the mobile terminal, to selectively demodulate the group signal of the mobile terminal;

checking out the address identifiers included in the headers of the communication cells which comprise the group signal, to identify each of the communication cells assigned to the mobile terminal; and processing the identified communication cells into the downstream transmission data of the channel of the mobile terminal.

8. A method of assigning a channel to a specific one of mobile terminals existing on a service area provided by a base station which has a plurality of codes, comprising the steps of:

classifying the plurality of codes into a plurality of channel groups to allocate a plurality of group codes of the channel groups to the plurality of the codes, respectively;

determining which channel group the specific mobile terminal belongs to;

labeling a unique address identifier in the channel group for the specific mobile terminal; and defining, as the channel assigned to the specific mobile terminal, a combination of the address identifier labeled for the specific mobile terminal and the group code corresponding to the channel group to which the specific mobile terminal belongs.

9. A channel assigning method as claimed in claim 8, further comprising the step of notifying the specific mobile terminal of the combination by the base station.

10. A channel assigning method as claimed in claim 9, wherein all of the steps are uniformly executed for all of the mobile terminals.

11. A method of multiplexing the channels defined in claim 10, on upstream transmission from the specific and the other mobile terminals to the base station, said method being executed in the specific mobile terminal and comprising the steps of:

packaging upstream transmission data of the channel corresponding to the specific mobile terminal, to form communication cells with headers each of which uniformly contains the address identifier of the specific mobile terminal;

detecting access contention between the specific and the other mobile terminals of the same channel group, to calculate idle times with no contention;

resolving the access contention by assigning the communication cells of the specific mobile terminal to the idle times;

spreading spectrums of the communication cells with the group code assigned to the channel group of the specific mobile terminal, to transmit spread signals of the communication cells through the assigned idle times, respectively.

12. A channel multiplexing method as claimed in claim 11, wherein the access contention detecting step monitors the upstream transmission from the other mobile terminals which belong to the same channel group as the specific mobile terminal, to obtain the idle times.

13. A channel multiplexing method as claimed in claim 12, wherein the access contention detecting step uses GPS timing signals to obtain synchronized timing of the upstream transmission from the other mobile terminals, so that the calculation of the idle times carries out quickly.

14. A channel multiplexing method as claimed in claim 12, wherein the access contention resolving step assigns the communication cells to the idle times with preceding and succeeding guard times left before and after each communication cell, respectively.

15. A channel multiplexing method as claimed in claim 11, wherein the communication cells are variable-length packets.

16. A channel multiplexing method as claimed in claim 11, wherein the communication cells are fixed-length packets.

17. A channel multiplexing method as claimed in claim 11, wherein the communication cells are ATM cells.

18. A base station for use in a mobile communication system comprising a mobile terminals and a base station controller which use ATM cells on transferring communication data between the base station and the base station controller, each of said mobile terminals being classified into one of terminal groups, said base station comprising:

a first circuit adapted to demultiplex the ATM cells transferred from the base station controller, in correspondence with the terminal groups;

a plurality of second circuits each adapted to translate headers of the ATM cells belonging to corresponding one of the terminal group, into other headers including address identifiers assigned to the mobile terminals of the corresponding terminal group, to produce translated ATM cells;

a plurality of third circuits each adapted to spread spectrums of the translated ATM cells with group code of the corresponding terminal group, to produce spread data signals; and a fourth circuit adapted to transmit the spread data signals into the mobile terminals.

19. A mobile terminal for use in the mobile communication system comprising the base station mentioned in claim 18, said mobile terminal comprising:

a communication antenna adapted to receive the spread data signal as a reception signal;

a demodulator adapted to despread the reception signal with the group code of the corresponding terminal group, to extract the ATM cells which belong to the corresponding terminal group;

an address identifying unit adapted to identify which ATM cells belong to the mobile terminal in question, by checking out the address identifiers included in the headers of the extracted ATM cells; and a CLAD device adapted to assemble the identified ATM cells into downstream transmission data sent for the mobile terminal in question, from the base station.

20. A mobile terminal as claimed in claim 19, wherein the CLAD device is also adapted to disassemble upstream transmission data of the mobile terminal into upstream ATM cells, said mobile terminal further comprising:

an access contention detector adapted to detect access contention between the mobile terminal and other mobile terminals of the same terminal group, to calculate idle times with no contention;

an access contention resolver adapted to resolve the access contention by assigning the upstream ATM cells of the mobile terminal to the idle times;

a modulator adapted to spread spectrums of the upstream ATM cells by the use of the group code assigned to the terminal group of the mobile terminal, to transmit a spread signal of the upstream ATM cells through the communication antenna at the assigned idle times.

21. A mobile terminal as claimed in claim 20, wherein:

the demodulator also supplies the extracted ATM cells to the access contention detector; and the access contention detector monitors the ATM cells to obtain the idle times on the upstream transmission from the other mobile terminals which belong to the same terminal groups as the mobile terminal, in question.

22. A mobile terminal as claimed in claim 21, further comprising a GPS timing generator adapted to generate GPS timing signals, so that the access contention detector uses the GPS timing signals to obtain synchronized timing of the upstream transmission from the other mobile terminals, and thereby the calculation of the idle times carries out quickly.

23. A mobile terminal as claimed in claim 22, wherein the GPS timing generator comprises: a GPS antenna; a GPS receiver coupled to the GPS antenna; and a clock unit coupled to the GPS receiver and adapted to produce the GPS timing signals.

24. A mobile terminal as claimed in claim 20, wherein the access contention resolver assigns the upstream ATM cells to the idle times with preceding and succeeding guard times left before and after each upstream ATM cell, respectively.

25. The base station cooperating with the mobile terminal mentioned in claim 20, wherein:

the fourth circuit is also adapted to receive, from all of the mobile terminals, the spread signals of the upstream ATM cells as upstream reception signals;

each of third circuits is operable to despread the upstream reception signals by the use of the group code of the corresponding terminal group, to produce the upstream ATM cells of the same terminal group;

each of second circuits is operable to translate the headers of the upstream ATM cells into other headers for the base station controller, to produce translated upstream ATM cells; and the first circuit is adapted to multiplex the translated upstream ATM cells of all of the terminal groups, to transfer multiplexed upstream ATM cells for the base station controller.

* * * * *

UNITED STATES PATENT AND TRADEMARK OFFICE
CERTIFICATE OF CORRECTION

PATENT NO.    : 6,504,833 B1                                                Page 1 of 1
DATED         : January 7, 2003
INVENTOR(S)   : Nobuaki Ishii and Masaaki Okada It is certified that error appears in the above-identified patent and that said Letters Patent is hereby corrected as shown below:

<u>Title page,</u>
Item [30], please delete Priority Data "11-350162" and insert -- 10-350162 --

Signed and Sealed this

Twenty-first Day of October, 2003

JAMES E. ROGAN
*Director of the United States Patent and Trademark Office*